United States Patent

[11] 3,550,968

| [72] | Inventor | John E. Rymes |
| | | Calgary, Alberta, Canada |
| [21] | Appl. No. | 715,378 |
| [22] | Filed | Mar. 22, 1968 |
| [45] | Patented | Dec. 29, 1970 |
| [73] | Assignee | Flex-Track Equipment Ltd. |
| | | Calgary, Alberta, Canada |
| | | a company of Canada, by mesne assignment |

[54] HIGH PERFORMANCE SNOW TRACK
3 Claims, 11 Drawing Figs.

[52] U.S. Cl........................................................ 305/54,
305/35
[51] Int. Cl........................................................ B62d 55/26
[50] Field of Search.......................................... 305/35
(EB)(Cursory), 35, 37, 38, 54, 55

[56] References Cited
UNITED STATES PATENTS

| 3,443,844 | 5/1969 | Schoonover.............. | 305/35X(EB) |
| 2,393,336 | 1/1946 | Meyers...................... | 305/54 |
| 2,515,128 | 7/1950 | Lammertse................ | 305/38 |
| 2,866,667 | 12/1958 | Ratkowski................. | 305/54 |
| 2,323,526 | 7/1943 | Eliason...................... | 305/35(EB) |
| 2,992,862 | 7/1961 | Fredricks.................. | 305/35X(EB) |
| 3,148,920 | 9/1964 | Nodwell.................... | 305/35(EB) |
| 3,165,364 | 1/1965 | Hardman................... | 305/35X(EB) |

*Primary Examiner*—Richard J. Johnson
*Attorney*—Smart and Biggar

ABSTRACT: The invention concerns a grouser bar for improving the traction of tracked vehicles in deep snow or other surface conditions in which the tracks act on a yielding terrain. The grouser bar has a depending snow blade which comprises both forward-traction elements and side-thrust elements.

INVENTOR
JOHN E RYMES
BY Smart & Biggar
ATTORNEYS.

PATENTED DEC 29 1970 3,550,968

INVENTOR
JOHN E. RYMES
BY Smart & Biggar
ATTORNEYS.

HIGH PERFORMANCE SNOW TRACK

BACKGROUND OF THE INVENTION

This invention relates to grouser bars for use in the endless tracks of track-laying vehicles and particularly for use in deep snow or other surface conditions in which the tracks act on a yielding terrain.

Deep snow has the characteristic that only the top layer or crust to a depth of the order of 30 inches is compactible to a significant degree. The snow below this crust of 30 inches is not significantly compactible and a compacting object, such as a vehicle, which is sufficiently loaded so as to break through the crust will sink easily further into the snow. To avoid vehicles breaking through the crust, the surface loading imposed by the vehicle on the snow is generally limited by design to be of the order of ½ lb. per sq. in. Such a low unit-area loading is obtained with vehicles of the track-laying type. Furthermore, uncompacted snow has little or no shear strength, it is not until the snow is compacted that it acquires shear strength. The shear strength of snow below a compacting substantially rigid object is related to the degree of compaction set up in the snow by the object. It is known to use this shear strength of the compacted crust to obtain tractive effort by providing depending cleats on the grouser bars of track-laying vehicles.

In use of the endless-track vehicle in mountainous terrain it is often necessary to traverse the side of a hill which may have a slope angle of e.g. 45°. When the vehicle is operating in deep snow, these are particularly difficult conditions since there is a component of the weight of the vehicle acting in a direction down the slope which causes the vehicle to slide down the slope and there is little or no side-thrust resistance, from the uncompacted snow, to such sliding. While the snow under the vehicle has been compacted, if the traction cleats each lie basically in a single plane, namely that plane transverse to the track of the track-laying vehicle, it can immediately be appreciated that although the shear strength of the compacted snow is being utilized for mobility in the forward sense, there is no usage of the shear strength in the snow to prevent any side slip that may occur.

It is an object of this invention to provide a grouser bar adapted to enable a vehicle to which it is fitted to operate effectively under the above noted conditions.

SUMMARY OF THE INVENTION

Accordingly, the invention provides a grouser bar for an endless-track vehicle comprising a belt-engaging base and snow-blade means depending therefrom, at least one first part of the blade means extending generally transversely of the direction of movement of the track and forming tractive-effort elements and a plurality of second parts of the blade means extending generally parallel to said direction and substantially across the width of the base in a spaced-apart manner along the base and forming side-thrust resisting elements.

The invention also particularly provides a grouser bar for an endless-track vehicle comprising a belt-engaging base and snow-blade means depending therefrom, the blade means being of elongated zigzag form transversely to the direction of movement of the track, and the blade means profile, as seen in the direction of movement of the track, providing increasing depth of the blade means towards the bar center.

BRIEF DESCRIPTION OF THE DRAWINGS

Embodiments of the invention will now be described by way of example, with reference to the accompanying drawings in which.

DESCRIPTION OF THE PREFERRED EMBODIMENTS

Many geographical areas have considerable snow fall on either an annual or year round basis. It is known that the terrain characteristic of snow is a most complex and difficult matter to define in the exact and finite terms. However, it is well known in the art that deep snow has a characteristic that is unique and is not found in any other kind of terrain. In very deep snow conditions, which can be either seasonal, ice capped, or high mountain snow, the properties of the snow pack change through the winter as the snow is metamorphosed. In seasonal snows much of the snow is generally soft and the lower layers suffer a grain growth and consequently a substantial reduction in their ability to bear load. In ice cap and high mountain snows the same phenomenom occurs, although to a different degree since other climatic conditions such as wind, rapid changes in temperature, etc., all have the effect of making the snows generally of a denser nature than that found in a seasonal snow pack.

This phenomenom of grain growth with depth occurs continually but is most pronounced after a depth of the order of 30 inches is reached. Snow below this depth is not significantly compactible and therefore if a compacting object such as a tracked vehicle is sufficiently loaded, or of such peculiar design, so as to break through the upper 30 inches of snow the vehicle will then sink more rapidly and easily into the metamorphosed snow underneath.

It is a requirement of a track-laying vehicle that the track in immediate contact with the terrain should have a relative speed through the terrain of zero so that mobility may take place. In certain terrains, a nominal amount of relative slip can be tolerated and, indeed, in some heavy clay and sod ground conditions, the relative slip between the track and the ground can greatly enhance the gradeability and mobility of the vehicle. In compacted snow it is generally suggested that zero slip will provide mobility, however, it is also recognized that a nominal amount of slip will enable the vehicle to give a slightly better performance than that at zero slip. It must, however, be pointed out that this nominal amount of relative slip between the track and the ground is of a very low order; any high slip occurring will effectively cause immediate immobility. Since, as has been related, the shear strength of snow is related to compaction thereof, it is necessary, for mobility in deep snow, to make use of this compacted snow or the shear strength thereof by sinking a plate into the snow normal to the track of the vehicle. A plurality of inserted plates in effect become traction cleats making use of the shear strength of the compacted snow. It has been related above that the shear strength of the snow is related to the degree of compaction therein.

Figure 1:
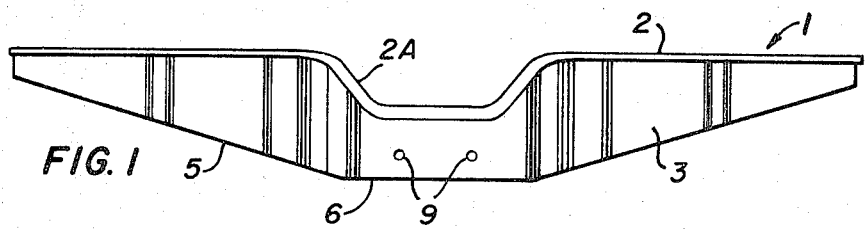
FIG. 1 is an elevational view of a grouser bar forming a first embodiment of the invention.
Figure 2:
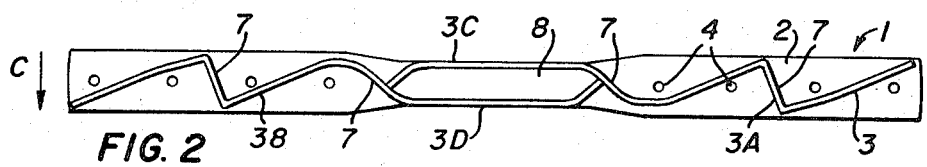
FIG. 2 is a plan view of the grouser bar of FIG. 1.

Thus in the embodiment of the invention shown in FIGS. 1 and 2 a grouser bar 1 comprises a base 2 for engaging a belt and snow-blade means 3. The base 2 is a substantially rigid plate of generally rectangular form and has a plurality of holes 4 passing therethrough for passage of bolts or other means to secure the bar to the belt. The center portion 2a of the base is U-shaped and forms a guide element for the supporting wheels of the vehicle.

The snow-blade means comprises two portions 3a and 3b. Each portion 3a and 3b as seen in elevational view in FIG. 1 has a generally trapezoidal shape except adjacent the center of the bar. Two sides of the trapezium are substantially parallel and extend away from the base and a third side forming the blade edge 5 extends between the parallel sides. This third side defines a blade profile which provides increasing depth of the blade means towards the bar center. The center portion 6 of the edge 5 of the snow-blade means as seen in elevation is parallel to the base 2 to provide a surface for contact with a firm surface. As seen in plan view in FIG. 2 the portions 3a and 3b are of elongated zig-zag form and have elements thereof which extend in a direction substantially parallel but at a slight angle to the direction of motion of the track, i.e. in the direction of the arrow C and substantially across the width of the base. These elements form side-thrust resisting elements and prevent side slip when a vehicle equipped with the grouser bars traverses the side of a hill in deep snow terrain conditions.

The inner end portions 3c and 3d respectively of the portions 3a and 3b of the snow-blade means overlap at the bar center and define a recess 8 in which may be inserted a running pad. Aligned holes 9 are provided in the portion 3c and 3d for bolts for securing the pad within the recess. The running pad may have a smooth surface of e.g. metal or rubber, for use on hard road surfaces, or may be in the form of picks for use on ice.

Figure 3:
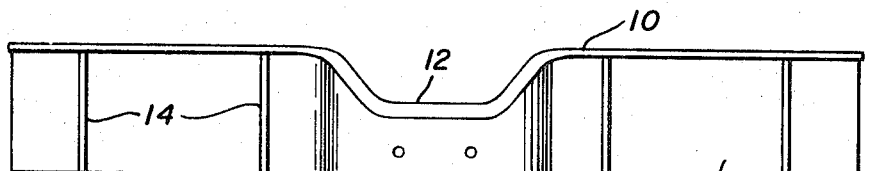
FIG. 3 is an elevational view of a grouser bar forming a second embodiment of the invention.
Figure 4:
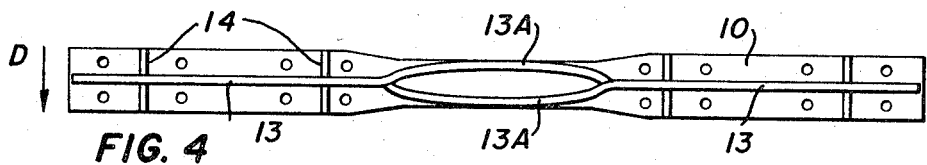
FIG. 4 is a plan view of the grouser bar of FIG. 3.

In FIGS. 3 and 4 are shown, respectively, elevation and plan views of another grouser bar according to the invention. In this embodiment there is provided a belt-engaging base 10 and snow-blade means 11 depending from the base. The base is formed with a center portion 12 of U-shaped configuration forming a wheel-guide element. The plates 13 form tractive-effort elements. The snow blade means comprises two rectangular plates 13, extending transversely of the direction of movement of the track, which movement is indicated by arrow D. The inner ends 13a of the plates overlap at the center of the track and define therebetween a recess for a running pad. The blade means 11 also comprises parts 14 which extend parallel to the direction of movement of the track. The parts 14 are in the form of rectangular plates and extend from the base to the free edge of the part 13 and are welded to the part 13 and the base 10. The parts 14 form side-thrust resisting elements.

Figure 5:
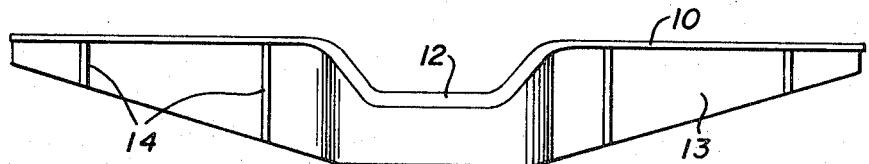
FIG. 5 is an elevational view of a modified form of the grouser bar of FIGS. 3 and 4.

In a modification of the bar of FIGS. 3 and 4, shown in FIG. 5, the first parts 13 of the snow-blade means have a blade edge profile which provides increasing depth of the blade means towards the bar center.

Figure 6:
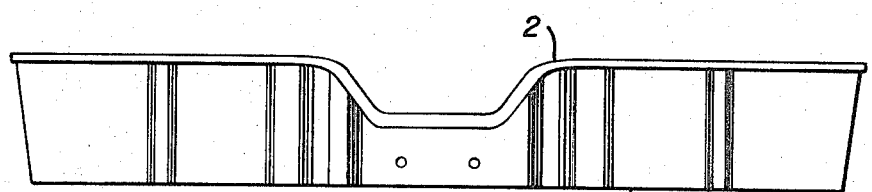
FIG. 6 is an elevational view of a modified form of the grouser bar of FIGS. 1 and 2.

In a modification of the bar of FIGS. 1 and 2, shown in FIG. 6, the blade edge, indicated at 5', extends generally parallel to the belt-engaging base 2. This provides the grouser bar with a substantially rectangular profile as seen in the direction of movement of the track.

Figure 7:
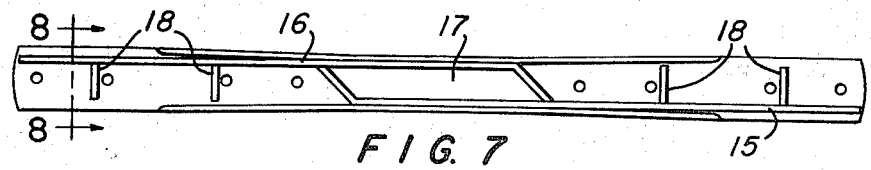
FIG. 7 is a top plan view of a modified form of grouser bar similar to that shown in FIG. 5.
Figure 8:
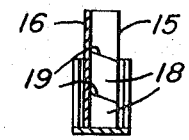
FIG. 8 is a view on line VIII-VIII of FIG. 7.

FIGS. 7 and 8 show yet another modification of the bar of FIGS. 1 and 2. In this example the snow-blade means has a transverse profile similar to that of FIG. 5. However the snow-blade means comprises two spaced-apart straight elements 15 and 16 having their inner ends overlapped and bent to define a recess 17 to receive e.g. a running pad. The elements 15 and 16 extend one adjacent each transverse edge of the grouser bar and have elements 18 secured thereto and extending towards the opposite transverse edge. The elements 18, see FIG. 8, are of generally rectangular form but have their free edges 19 slightly cut away.

Figure 11:
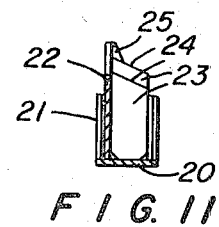
FIG. 11 is a view on line XI-XI of FIG. 9.
Figure 9:
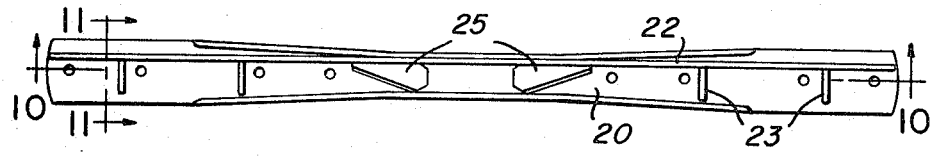
FIG. 9 is a top plan view of a grouser bar forming a third embodiment of the invention.
Figure 10:
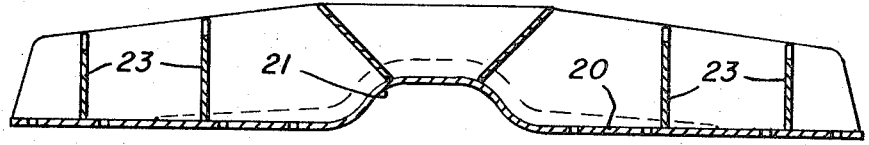
FIG. 10 is a view on line X-X of FIG. 9.

FIGS. 9 to 11 show a third embodiment of the invention. The grouser bar comprises a base 20 having a U-shaped wheel receiving portion 21. The snow-blade means comprises a single straight element 22 which extends from one end to the other end of the base. The profile of the element 22 is parallel to the base in the center and tapers slightly towards each end of the bar. The element 22 extends along one transverse edge of the base and side-thrust resisting elements 23 are spaced along the bar and extend in a direction parallel to the direction of movement of the track. The elements 23 are of generally rectangular shape but are cut away slightly at their free edges 24 (see FIG. 11). Supporting gussets 25 are provided adjacent the central portion of the element 22.

In one use of grouser bars according to the invention a plurality of the bars are incorporated in the tracks of a two-track laying vehicle. Every grouser bar of the track is fashioned according to the present invention and it is found that such a vehicle is able to traverse, in deep snow, both steep gradients and the sides of hills in an effective manner with a minimum of slip in both the forward direction and the sideways direction.

To achieve the maximum available tractive effort it is deemed advisable to include in the tracks of a two-track laying vehicle, grouser bars having a substantially rectangular shape projection, e.g. grouser bars as described with reference to FIG. 6 of the drawings. The introduction of these bars affords additional compacted snow for forward mobility purposes. The enlarged traction area is designed to provide additional tractive effort in the regions of snow previously not used by the other bars and at the same time, because of the known advantages of nominal relative slip between the track and the terrain, these rectangular shaped blades can, in their own right, act as compaction units in a horizontal sense. It would not be possible to introduce this rectangular blade at every grouser bar location because there is not a substantial distance between each grouser bar and hence there would be insufficient additional compaction in the horizontal sense available. It has been found preferable that a rectangular shaped blade be included at between every sixth and tenth position of a grouser bar, the remaining bars having a profile of the blade illustrated in FIG. 1 of the drawings.

While the present invention has been described with reference to deep snow conditions, it will be appreciated that it is equally suitable in other terrains which have low shear strength characteristics, such as sandy surfaces.

I claim:

1. A grouser bar for an endless-track vehicle comprising an elongated belt-engaging base and snow-blade means extending along the length of the base and depending therefrom, said snow blade means comprising two parts, each part having an end portion extending generally lengthwise of the base and an elongated zigzag portion, said end portions overlapping in the center of the know-blade means and providing holding means for a running pad and each zigzag portion extending away from the holding means towards a respective end of the snow-blade means, said zigzag portions having longer parts providing tractive effort elements and shorter parts providing side-thrust resisting elements.

2. A bar according to claim 1 wherein the said overlapping end portions are spaced apart to define a recess within which a running pad may be located.

3. A grouser bar for an endless-track vehicle comprising an elongated belt-engaging base and show-blade means extending along the length of the base and depending therefrom, said snow-blade means extending generally transversely of the direction of movement of the track and forming tractive-effort elements and side-thrust resisting elements, the snow-blade means having a profile which, as seen in the direction of movement of the track, provides increasing depth of the blade means towards the bar center, and the snow-blade means comprising at least one portion of elongated zigzag form having longer parts extending generally transversely along and at a slight angle to an axis transverse of said direction and forming said tractive effort elements and shorter parts extending generally parallel and at a slight angle to said direction and substantially across the width of said base and forming said side-thrust resisting elements.